Jan. 10, 1950          J. DI BARI          2,494,289

COMBINED BOTTLE COOLER AND HOLDER

Filed March 29, 1948          2 Sheets-Sheet 1

INVENTOR.
JOSEPH DI BARI
BY
ATTORNEY

Jan. 10, 1950 J. DI BARI 2,494,289
COMBINED BOTTLE COOLER AND HOLDER
Filed March 29, 1948 2 Sheets-Sheet 2
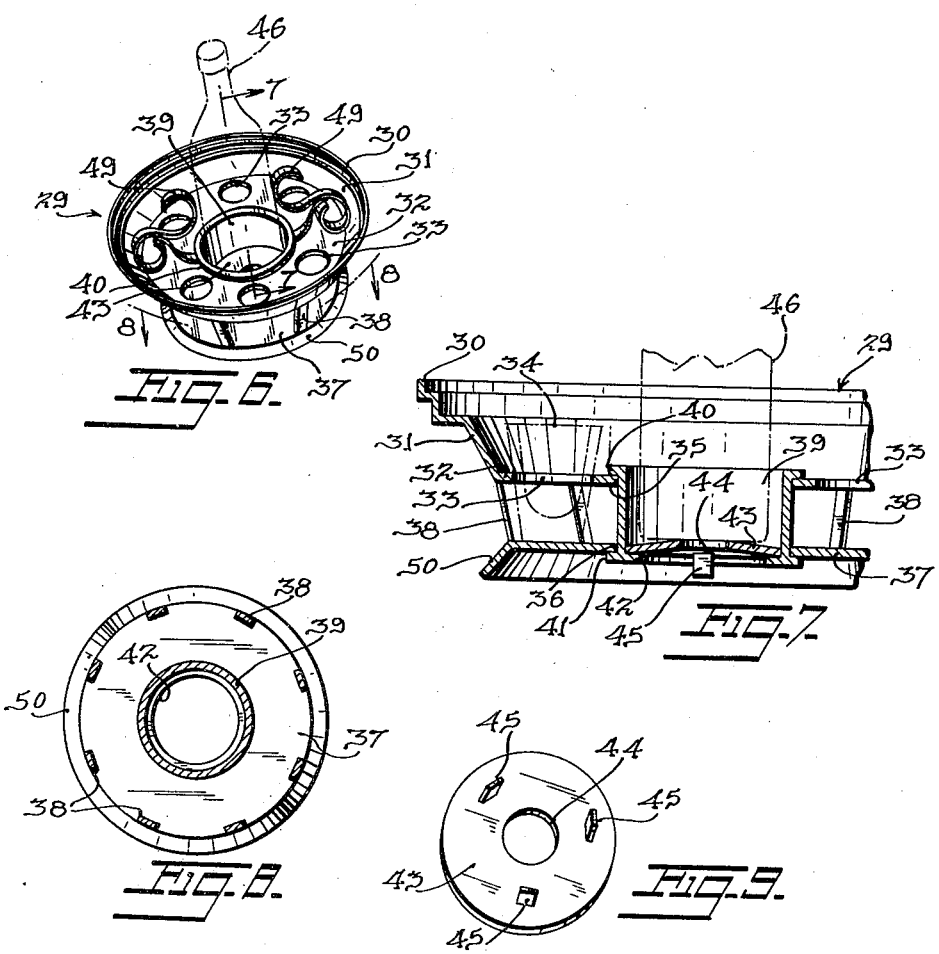
INVENTOR.
JOSEPH DI BARI
BY
ATTORNEY Patented Jan. 10, 1950

2,494,289

UNITED STATES PATENT OFFICE 2,494,289

COMBINED BOTTLE COOLER AND HOLDER

Joseph Di Bari, Brooklyn, N. Y.

Application March 29, 1948, Serial No. 17,618

10 Claims. (Cl. 62—76)

This invention relates to a bottle and glass holder, and more particularly to a serving and chilling container for a bottle of liquor and for liquor glasses.

An object of the present invention is to provide a utensil, which is attractive and ornamental, and which can be placed on display, both when it is being used and when it is being stored, which utensil when in use, contains a bottle of liquor, liquor glasses, a serving tray for the liquor glasses, and an ice receptacle.

A further object is to provide a utensil as aforesaid, having a bottle supporting plate which can be mounted in one of two vertically spaced positions.

Another object is to provide a utensil as aforesaid, which can be substantially sealed so that it acts as a refrigerator for the liquor.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 6 is a perspective view of the glass tray.

Fig. 7 is an enlarged fragmentary vertical sectional view taken on the line 7—7 of Fig. 6.

Fig. 8 is an enlarged horizontal sectional view taken on the line 8—8 of Fig. 6.

Fig. 9 is an inverted perspective of a plate shown in section in Fig. 7.

Fig. 10 is a perspective of a sleeve for containing the bottle.

Fig. 11 is a horizontal sectional view taken on the line 11—11 of Fig. 10.

Figure 1:
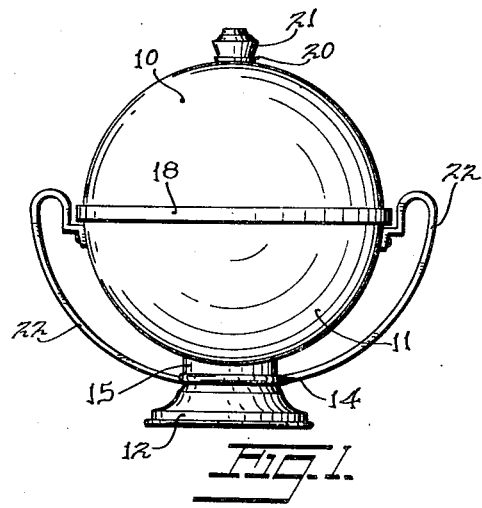
Fig. 1 is a side view of a bottle and glass holder constructed in accordance with this invention.
Figure 2:
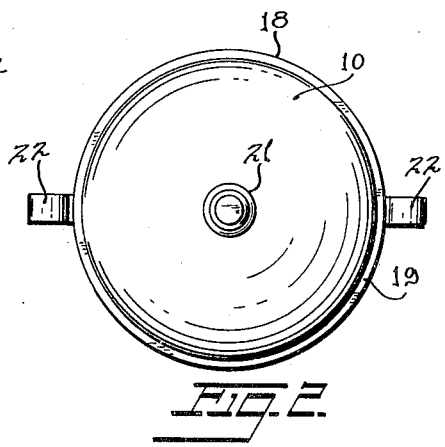
Fig. 2 is a plan view of the holder.
Figure 3:
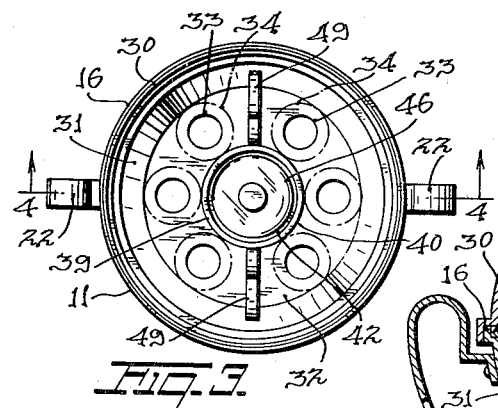
Fig. 3 is a plan view with the cover removed.

The bottle and glass holder, according to the present invention, includes a container formed by two substantially hemispherical elements 10 and 11 mounted on a base 12. The construction of these parts can best be understood from Fig. 4, wherein they are shown in section. The bottom element 11 is integral with the base 12, and these parts may be constructed in any desired manner, including making them separately and welding them together. The base is circular in horizontal section and stepped, and has a top wall 13 and a top outer bulbous flange 14. Above the top wall 13 there is a cylindrical neck 15, which blends into the bottom element 11 so that their interiors are in communication. The top margin of the bottom element 11 is suddenly increased in diameter by a sharp offset to provide a vertical flange 16, which borders an interior shoulder 17.

The top element 10 has a flange 18, similar to flange 16 and surrounding same and providing a shoulder 19. At its top, the top element 10 has a flared opening 20 in which is secured a hollow knob 21. Diametrally opposite handles 22 are secured to the bottom element 11, the handles 22 being riveted at their tops and welded to the bulbous flange 14 at their bottoms.

A member 23, shown in Fig. 10, is disposed in the bottom element 11. This member 23 has a high inner cylinder or sleeve 24, an outer cylinder 25 which is spaced from and shorter than sleeve 24, a bottom connecting wall 26, and a flared flange 27 at the upper end of cylinder 25. The flange rests on the margin of the bottom element 11 around the cylindrical neck 15. Cylinder 24 has orifices 28 at its bottom end.

Figure 4:
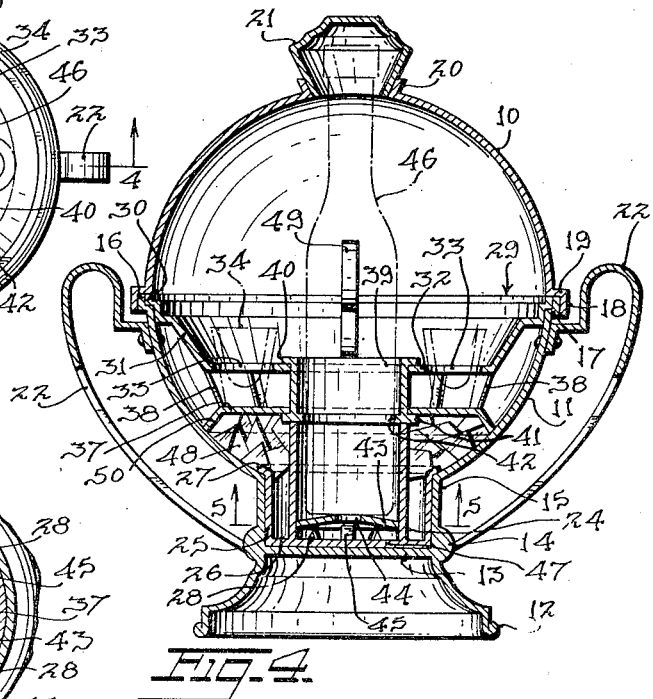
Fig. 4 is an enlarged vertical sectional view taken on the line 4—4 of Fig. 3.
Figure 5:
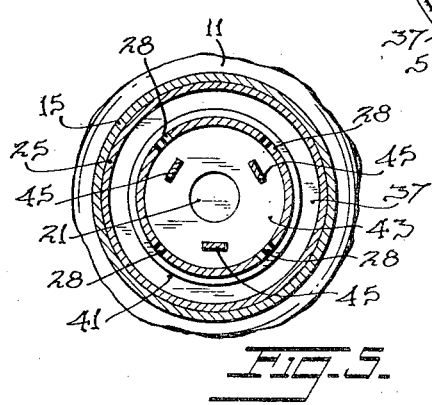
Fig. 5 is a horizontal sectional view taken on the line 5—5 of Fig. 4.

A tray 29, see Fig. 7, is also mounted in bottom element 11, see Fig. 4. This tray has a top flange 30 resting on the shoulder 17. Shoulder 19 and the flange 18 cover the flange 30 and the flange 16. The tray side wall 31 tapers inwardly to a horizontal wall 32 which has a circular row of holes 33 for receiving liquor glasses 34. Glasses 34 are conical or tapered, and the defining edge of each hole 33 is similarly conical or tapered so that the glasses pass about half way through the holes before being supported by the wall 32. The wall 32 also has a large center hole 35 in line with a similar hole 36 in a wall 37 parallel to, spaced from, and connected to wall 32 by substantially vertical spaced struts 38. A sleeve 39 is disposed in the holes 35—36, and has a flange 40 overlying the wall 32, a flange 41 underlying the wall 37 and an inner flange 42. A disc 43 is removably mounted on flange 42. This disc 43, see Figs. 7 and 9 has a center hole 44 and depending tabs 45. It is concave on its upper face. A bottle 46 of liquor may be supported on disc 43 in sleeve 39, see Fig. 7, or the disc 43 may be placed in the bottom of cylinder 24, see Fig. 4, to lower the effective height of the bottle so that the top element 10 can be mounted on the bottom element 11. For this purpose, the bottom of cylinder 24 is closed by a wall 47 which rests on wall 13, and the tabs 45 form legs standing on the wall 47. Ice 48 is contained in the space below the wall 37 and above the flange 27, see Fig. 4.

When the utensil is not being used, it may be placed on a buffet or other position where it is conspicuous, since it is attractive and ornamental in outside view, see Fig. 1. At such times it may contain, if desired, the empty glasses 34 and the full bottle of liquor 46. Thus, these articles are always ready for instant use. The top of the bottle fits in the hollow interior of the knob 21, see Fig. 4, so that the overall height of the utensil is minimized.

When the utensil is to be used, the ice 48 is added. This chills the contents of the bottle 46 and chills the contents of the glasses 34 if they are filled with liquor. Furthermore, the ice is available for use in highballs. The tight fit of the two elements 10 and 11 prevents undue melting of the ice and forms a refrigerator of the utensil.

When it is desired to serve drinks, the top element 10 is removed. The bottle 46 is withdrawn and uncorked, and drinks poured. Ice is prevented from falling into the sleeve 24 by the fit of the sleeve 39 on the sleeve 24, see Fig. 4, wherein it will be seen that the flange structure 41—42 rests on the top edge of the sleeve 24. The dripping of the ice fills the space between the cylinders 24 and 25 with ice water and this ice water is brought into contact with the bottom of the bottle by means of the holes 28.

The tray 29 is used for dispensing the drinks. To this end it is provided with two handles 49, see Fig. 6. The tray may be lifted off of the bottle, or the bottle removed first. The tray may be rested on the table, it being provided with an annular base 50 flaring downwardly from the outer periphery of the wall 37 for this purpose. After one round of drinks, the tray may be returned to the bottom element 11, and if more drinks are to be served, the disc 43 is first removed from the sleeve 24 and placed in the sleeve 39, resting on top of the flange 42. Thus, the bottle 46 may be supported at the same level as the glasses. Since the bottle will be wet due to the drippings from the ice, this wetness will drop off through the hole 44 and will drop back into the cylinder 24.

While I have illustrated and described the preferred embodiment of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A holder for liquor glasses and a liquor bottle comprising a base, a bottom receptacle mounted on said base, a top cover mounted on said receptacle, a member including a short outer cylinder and a long inner sleeve spaced from said cylinder positioned in said base, a bottom wall closing the bottom of said sleeve and connecting it with said short cylinder, a tray having its periphery mounted in said receptacle, and having a row of glass mounting holes.

2. A holder for liquor glasses and a liquor bottle comprising a base, a bottom receptacle mounted on said base, a top cover mounted on said receptacle, a member including a short outer cylinder and a long inner sleeve spaced from said cylinder positioned in said base, a bottom wall closing the bottom of said sleeve and connecting it with said short cylinder, a tray having its periphery mounted in said receptacle, and having a row of glass mounting holes, said long inner sleeve having holes connecting its interior with the space between it and said short outer cylinder whereby when ice is supported in the receptacle, its drippings can pass into said long inner sleeve, said long inner sleeve being adapted to store a liquor bottle.

3. A holder for liquor glasses and a liquor bottle comprising a base, a bottom receptacle mounted on said base, a top cover mounted on said receptacle, a member including a short outer cylinder fitting in said base, a long inner sleeve spaced from said cylinder, a bottom wall closing the bottom of said sleeve and connecting it with said short cylinder, a tray having its periphery mounted in said receptacle, and a row of glass mounting holes, said long inner sleeve having holes connecting its interior with the space between it and said short outer cylinder whereby when ice is supported in the bottom receptacle, its drippings can pass into said long inner sleeve, said long inner sleeve being adapted to store a liquor bottle.

4. A holder for liquor glasses and a liquor bottle comprising a bottom receptacle having an upper substantially hemi-spherical portion mounted on and communicating with an upright cylindrical neck portion of a base, a top cover mounted on said receptacle, a member including a short outer cylinder fitting in said neck and having a supporting flange engaging said hemispherical portion about said neck, a long inner sleeve spaced from said cylinder, a bottom wall closing the bottom of said sleeve and connecting it with said short cylinder, a tray having its periphery mounted in said receptacle, and a row of glass mounting holes, said long inner sleeve having holes connecting its interior with the space between it and said short outer cylinder whereby when ice is supported in the bottom receptacle, its drippings can pass into said long inner sleeve, said long inner sleeve being adapted to store a liquor bottle.

5. A holder for liquor glasses and a liquor bottle comprising a bottom receptacle having an upper substantially hemi-spherical portion mounted on and communicating with an upright cylindrical neck portion of a base, a top cover mounted on said receptacle, a member including a short outer cylinder fitting in said neck, a long inner sleeve spaced from said cylinder, a bottom wall closing the bottom of said sleeve and connecting it with said short cylinder, a tray having its periphery mounted in said receptacle, two spaced horizontal walls connected by struts and having aligned central holes, a sleeve bridging said holes and having an inwardly projecting lip, and a row of glass mounting holes in the upper of said horizontal walls, said long inner sleeve having holes connecting its interior with the space between it and said short outer cylinder whereby when ice is supported in the bottom receptacle, its drippings can pass into said long inner sleeve, said long inner sleeve being adapted to store a liquor bottle.

6. A holder for liquor glasses and a liquor bottle comprising a bottom receptacle having an upper substantially hemi-spherical portion mounted on and communicating with an upright cylindrical neck portion of a base, a top cover mounted on said receptacle, a member including a short outer cylinder fitting in said neck, a long inner sleeve spaced from said cylinder, a bottom wall closing the bottom of said sleeve and connecting it with said short cylinder, a tray having its periphery mounted in said receptacle, and a row of glass mounting holes, and a disc having a central hole and adapted to be mounted alternately on the bottom wall of said long inner sleeve and on said lip, said long inner sleeve having holes connecting its interior with the space between it and said short outer cylinder whereby when ice is supported in the bottom receptacle, its drippings can pass into said long inner sleeve, said long inner sleeve being adapted to store a liquor bottle.

7. A holder for liquor glasses and a liquor bottle comprising a base having an upright cylindrical neck, a bottom substantially hemi-spherical element mounted on and communicating with said neck and having a shoulder at its upper edge, a top substantially hemi-spherical element mounted on said bottom element, a member including a short outer cylinder fitting in said neck and having a supporting flange engaging said bottom element about said neck, a long inner sleeve spaced from said cylinder, a bottom wall closing the bottom of said sleeve and connecting it with said short cylinder, a tray having its periphery mounted in said shoulder and comprising two spaced horizontal walls connected by struts and having aligned central holes, a sleeve bridging said holes and having an inwardly projecting lip, and a row of glass mounting holes in the upper of said horizontal walls, and a disc having a central hole and adapted to be mounted alternately on the bottom wall of said long inner sleeve or on said lip, said long inner sleeve having holes connecting its interior with the space between it and said short outer cylinder whereby when ice is supported in the bottom element, its drippings can pass into said long inner sleeve, said long inner sleeve being adapted to store a liquor bottle.

8. A holder for liquor glasses and a liquor bottle comprising a base having an upright cylindrical neck, a bottom substantially hemi-spherical element mounted on and communicating with said neck and having a shoulder at its upper edge, a top substantially hemi-spherical element mounted on said bottom element and having a hollow knob at its top communicating with the interior of said top element, a member including a short outer cylinder fitting in said neck and having a supporting flange engaging said bottom element about said neck, a long inner sleeve spaced from said cylinder, a bottom wall closing the bottom of said sleeve and connecting it with said short cylinder, a tray having its periphery mounted in said shoulder and comprising two spaced horizontal walls connected by struts and having aligned central holes, a sleeve bridging said holes and having an inwardly projecting lip, and a row of glass mounting holes in the upper of said horizontal walls, and a disc having a central hole and adapted to be mounted alternately on the bottom wall of said long inner sleeve or on said lip, said long inner sleeve having holes connecting its interior with the space between it and said short outer cylinder whereby when ice is supported in the bottom element, its drippings can pass into said long inner sleeve, said long inner sleeve being adapted to store a liquor bottle disposed with its top in said hollow knob.

9. A holder for liquor glasses and a liquor bottle comprising a base having a horizontal wall and thereabove an upright cylindrical neck, a bottom substantially hemi-spherical element mounted on and communicating with said neck and having a shoulder at its upper edge, a top substantially hemi-spherical element mounted on said bottom element and having a hollow knob at its top communicating with the interior of said elements, a member including a short outer cylinder fitting in said neck and having a supporting flange engaging said bottom element about said neck, a long inner sleeve spaced from said cylinder, a bottom wall resting on the horizontal wall of said base and closing the bottom of said sleeve and connecting it with said short cylinder, a tray having its periphery mounted in said shoulder and comprising two spaced horizontal walls connected by struts and having aligned central holes, a sleeve bridging said holes and having an inwardly projecting lip, and a row of glass mounting holes in the upper of said horizontal walls, and a disc having a central hole and adapted to be mounted alternately on the bottom wall of said long inner sleeve or on said lip, said long inner sleeve having holes connecting its interior with the space between it and said short outer cylinder whereby when ice is supported in the bottom element, its drippings can pass into said long inner sleeve, said long inner sleeve being adapted to store a liquor bottle disposed with its top in said hollow knob.

10. A holder for liquor glasses and a liquor bottle comprising a base having an upright cylindrical neck, a bottom substantially hemi-spherical element mounted on and communicating with said neck and having a shoulder at its upper edge, a top substantially hemi-spherical element mounted on said bottom element and having a hollow knob at its top communicating with the interior of said elements, a member including a short outer cylinder fitting in said neck and having a supporting flange engaging said bottom element about said neck, a long inner sleeve spaced from said cylinder, a bottom wall closing the bottom of said sleeve and connecting it with said short cylinder, a tray having its periphery mounted in said shoulder, two spaced horizontal walls connected by struts and having aligned central holes and comprising a sleeve bridging said holes and having a flange overlying the top horizontal wall, a flange underlying the bottom horizontal wall, and an inwardly projecting lip, and a row of glass mounting holes in the upper of said horizontal walls, and a disc having a central hole and adapted to be mounted alternately on the bottom wall of said long inner sleeve or on said lip, said long inner sleeve having holes connecting its interior with the space between it and said short outer cylinder whereby when ice is supported in the bottom element, its drippings can pass into said long inner sleeve, said long inner sleeve being adapted to store a liquor bottle disposed with its top in said hollow knob.

JOSEPH DI BARI.

No references cited.